United States Patent [19]

Titzer

[11] Patent Number: 5,620,157

[45] Date of Patent: Apr. 15, 1997

[54] CAR WASH BOOM SYSTEM

[76] Inventor: Charles D. Titzer, 5977 Sharon Rd., Newburgh, Ind. 47630

[21] Appl. No.: 336,045

[22] Filed: Nov. 4, 1994

[51] Int. Cl.$^6$ ................................................ E21F 17/02
[52] U.S. Cl. ............................ 248/58; 248/59; 239/750
[58] Field of Search ............................ 248/58, 59, 75, 248/49, 333, 283.1; 239/750, 751, 752

[56] References Cited

U.S. PATENT DOCUMENTS

| | | | |
|---|---|---|---|
| 3,422,827 | 1/1969 | McCulloch | 239/751 |
| 3,481,346 | 12/1969 | McBurnett | 239/751 |
| 3,593,730 | 7/1971 | Burchett | 239/751 |
| 3,648,316 | 3/1972 | Habian et al. | 15/21 E |
| 4,456,177 | 6/1984 | Johnson | 239/209 |
| 5,110,049 | 5/1992 | Harris et al. | 239/209 |

*Primary Examiner*—Leslie A. Braun
*Assistant Examiner*—Willie Berry, Jr.
*Attorney, Agent, or Firm*—Diller, Ramik & Wight, PC

[57] ABSTRACT

A car wash boom system of the present invention includes a low pressure washing brush boom and a high pressure pre-rinsing/rinsing wand boom which are mounted for relative rotation about side-by-side generally vertical axes. The washing brush boom includes first and second opposite end portions and a medial portion therebetween with a first and second portions being generally parallel to each other and the medial portion being normal thereto. A cam follower is carried by the second end portion of the washing brush boom and rides along a generally circular cam surface whose axis is the vertical axis of rotation of the washing brush boom. The second offset portion of the washing brush boom is mounted for rotation about a generally horizontal axis which is normal to its vertical axis of rotation. A torsion spring normally urges the washing brush boom to an inoperative position in which the first end portion of the washing brush boom lies in a horizontal plane above a horizontal plane of rotation of the pre-rinsing/rinsing wand boom. When in the latter position, the pre-rinsing/rinsing wand boom can rotation freely beyond 360° about its vertical axis absent interference with the washing brush boom, particularly when the latter is in its "parked" position.

46 Claims, 5 Drawing Sheets

CAR WASH BOOM SYSTEM

BACKGROUND OF THE INVENTION

This invention is directed to a novel car wash boom system associated with so-called self-service car wash bays which utilize coin-operated low pressure washing brushes and high pressure pre-washing, rinsing wands.

A typical car wash boom system utilizes one or more bays, generally open-ended into which an automobile or similar vehicles can be driven. Coins, tokens and/or paper currency are inserted in a coin/token/currency acceptor which is associated with an appropriate selector dial, switch or push-buttons. The selector dial can be utilized to, for example, first select the delivery of high pressure pre-wash or rinse water which is directed by a conventional manually operated wand against the exterior of the vehicle to wet/moisten the same prior to washing. The selector can next be moved to a washing position in which low pressure washing (soapy) water is delivered through a relatively long handled washing brush. The vehicle is washed with the brush and at the completion of the washing operation the brush is put aside and the vehicle is once again rinsed with the high pressure rinsing (no soap) wand.

During the rinsing, washing, waxing, etc. procedure, the person performing the same uses the rinsing wand and the washing brush alternatively and during this procedure generally walks around the vehicle. The washing brush and the rinsing wand are, of course, joined by suitable flexible hoses to appropriate booms which are mounted from above for rotational movement about one or more vertical axes. Unless otherwise provided for, as the person walks around the vehicle during the performance of a particular operation, there is a tendency for the booms and the associated hoses to interfere with each other, and normally the person cannot walk completely around the vehicle (360°). If, for example, one of the washing brush and rinsing wand is supported by holsters, brackets or holders on one of opposite walls of the vehicle bay as is the normal situation, the person performing either a washing or a rinsing operation cannot walk completely around the vehicle because of interference between the booms and/or hoses, and the user must thereafter retrace his/her path and walk in the opposite direction. This is because the hoses and the associated booms are so mounted that they prevent the washing brush and its associated hose and boom from crossing or by-passing the rinsing wand and its hose and boom and vice versa. Thus, time is wasted during the performance of any particularly pre-rinsing, washing and/or final rinsing operation and most users of such self-service car washes are aware that wasted time is wasted money in the sense that only a predetermined time for washing, rinsing, etc. is purchased for a particular amount of money deposited in the acceptor mechanism. Accordingly, it is highly desirable to allow a person washing the vehicle to walk 360° and beyond around the vehicle in a noninterfering manner irrespective of whether the person is using the washing brush or the rinsing wand and irrespective of the location of the holster or support for either. Such unrestrained and uncumbersome movement allows a vehicle to be pre-rinsed, washed, final rinsed and/or waxed rapidly and efficiently and, of course, at minimal cost.

Needless to say, the frustrations of retracing ones steps and becoming involved with intertwined hoses and booms and the aggravation associated therewith is entirely eliminated.

A rotatable boom system which allows unfettered rotation of washing and rinsing booms through 360° is disclosed in U.S. Pat. No. 5,110,049 granted on May 5, 1992 and entitled Rotatable Boom System for Dispensing Fluids in the name of Harris et al. However, in this boom system both the washing brush boom and the rinsing wand boom rotate about a single axis and this is accomplished through the utilization of a relative complex universal connector and intricately mounted booms. This boom system is relatively expensive to manufacture but each boom arm thereof is capable of unlimited angular rotation about a common vertical axis. If a conventional car wash boom system includes two conventional booms mounted for rotation about adjacent vertical axes, the boom system of this invention would require the elimination of both side-by-side boom systems and the substitution thereof by the dual boom arm system of this patent. Obviously, this is a relatively costly approach to the problem of unlimited boom arm rotation because two conventional boom arms are both totally eliminated with the cost attendant thereto coupled with the cost of purchase and installation of the complex single axis boom system of the latter patent.

A single boom arm swivel assembly is disclosed in U.S. Pat. No. 4,456,177 granted on Jun. 26, 1984 to Johnson. This patent is unconcerned with both a low pressure washing brush and a high pressure rinsing wand and instead is concerned simply with a single hose boom arm associated with a spray wand and an associated self-return mechanism. The self-return mechanism returns the hose boom arm to a position such that the drooping portion of the hose is held out of the path of a vehicle as it moves into the bay. The latter is achieved through a spring-biased cam and cam follower assembly.

U.S. Pat. No. 3,648,316 granted on Mar. 14, 1972 to G. Habian and entitled Surface-Treating Apparatus discloses a pair of adjacent booms each pivoted for rotation about its associated vertical axis and each provided with boom arms that can telescope. However, no provision is provided to allow either boom arm to pivot through 360° and beyond relative to the other boom arm and thus each possesses the inherent disadvantages in adjacent side-by-side pivoted booms irrespective of the particular utilization thereof.

SUMMARY OF THE INVENTION

In keeping with the foregoing, a primary object of the present invention is to provide a novel apparatus for effecting side-by-side rotation of a pair of elements about substantially parallel vertical axes of rotation absent interference therebetween. Though the apparatus is specifically designed for utilization with a coin/token/currency car wash boom system of the drive-in car bay type, it is equally designed for utilization in virtually any arena in which two elements must be rotated relative to each other, each beyond 360° absent any interference from each other, with the rotation occurring with respect to individual side-by-side axes of rotation.

As applied to the car wash boom system of this invention, a support is provided for a low pressure washing brush boom and another support is provided for a high pressure pre-rinsing/rinsing wand boom. Both the washing brush boom and the pre-rinsing/rinsing wand boom support an associated flexible hose which has a vertically descending portion essentially suspended from its respective boom and at its end having secured thereto its associated low pressure washing brush and high pressure rinsing wand. Normally there is a holster at opposite sides of an associated car bay in which a car or similar vehicle is to be washed and the low pressure washing brush and the high pressure wand are each normally supported in such holsters when not in use. The supports for the booms have appropriate journalling means for permitting the booms to rotate each about an associated vertical axis with the vertical axes being in generally spaced parallel relationship to each other.

In keeping with this invention, the washing brush boom includes first and second opposite end portions and a medial portion therebetween with the first and second portions being generally parallel to each other and the medial portion being normal thereto. A cam follower is carried by the second end portion of the washing brush boom and rides along a generally circular cam surface whose axis is the vertical axis of rotation of the washing brush boom. The second offset portion of the washing brush boom is also mounted for rotation about a generally horizontal axis which is generally also normal to the vertical axis of rotation of the washing brush boom, and spring biasing means in the form of a torsion spring normally urges the washing brush boom to an inoperative position in which the first end portion of the washing brush boom lies in a horizontal plane above a horizontal plane of the pre-rinsing/rinsing wand boom. Therefore, when in the latter position, the pre-rinsing/rinsing wand boom can rotate freely beyond 360° about its vertical axis absent interference with the washing brush boom and particularly when the first end portion thereof is placed in its "parked" horizontal plane above the horizontal plane of the rinsing wand boom. The cam follower surface will, however, cause the washing brush boom to rotate against the bias of the spring or biasing means about its horizontal axis from its "parked" horizontal plane into another horizontal plane beneath the horizontal plane of the rinsing wand boom in the latter position, the washing brush boom can be rotated beyond 360° in noninterfering relationship with the rinsing wand boom, the hose thereof descending from the rinsing wand boom and the rinsing wand boom itself when the latter is housed in its holster.

Though the present invention is directed specifically to constructing the washing brush boom as an offset boom for rotation about two axes normal to each other, one vertical and one horizontal, the invention is equally applicable to so constructing the high pressure rinsing wand boom. In other words, the washing brush boom can simply be constructed for rotation about a single vertical axis and the high pressure rinsing wand boom can be constructed in the offset relationship heretofore defined and mounted for rotation about both vertical and horizontal axes.

Due to the car wash boom system just described, a user of either the washing brush or the rinsing wand can walk around an automobile, truck or similar vehicle well beyond 360° and further utilize either the washing brush or the rinsing wand and do so without either boom or the hoses associated therewith interfering with each other. Thus, in accordance with this invention, either of the two booms can be pivoted about two axes of rotation, one of which moves a free end portion of the boom between two generally spaced horizontal planes in one of which the remaining boom can pass freely beyond 360° and in the other of which the first-mentioned boom can do the same thereby effecting noninterfering, rapid and efficient pre-rinsing/rinsing, brush washing and high speed final rinsing of an automobile or similar vehicle by the apparatus of the present invention.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 7, which appears upon the sheet of drawing containing FIG. 4, is a perspective view of an end portion of the washing brush boom, and illustrates details of the connection of the cam follower to the boom.

DESCRIPTION OF THE PREFERRED EMBODIMENT

Figure 1:
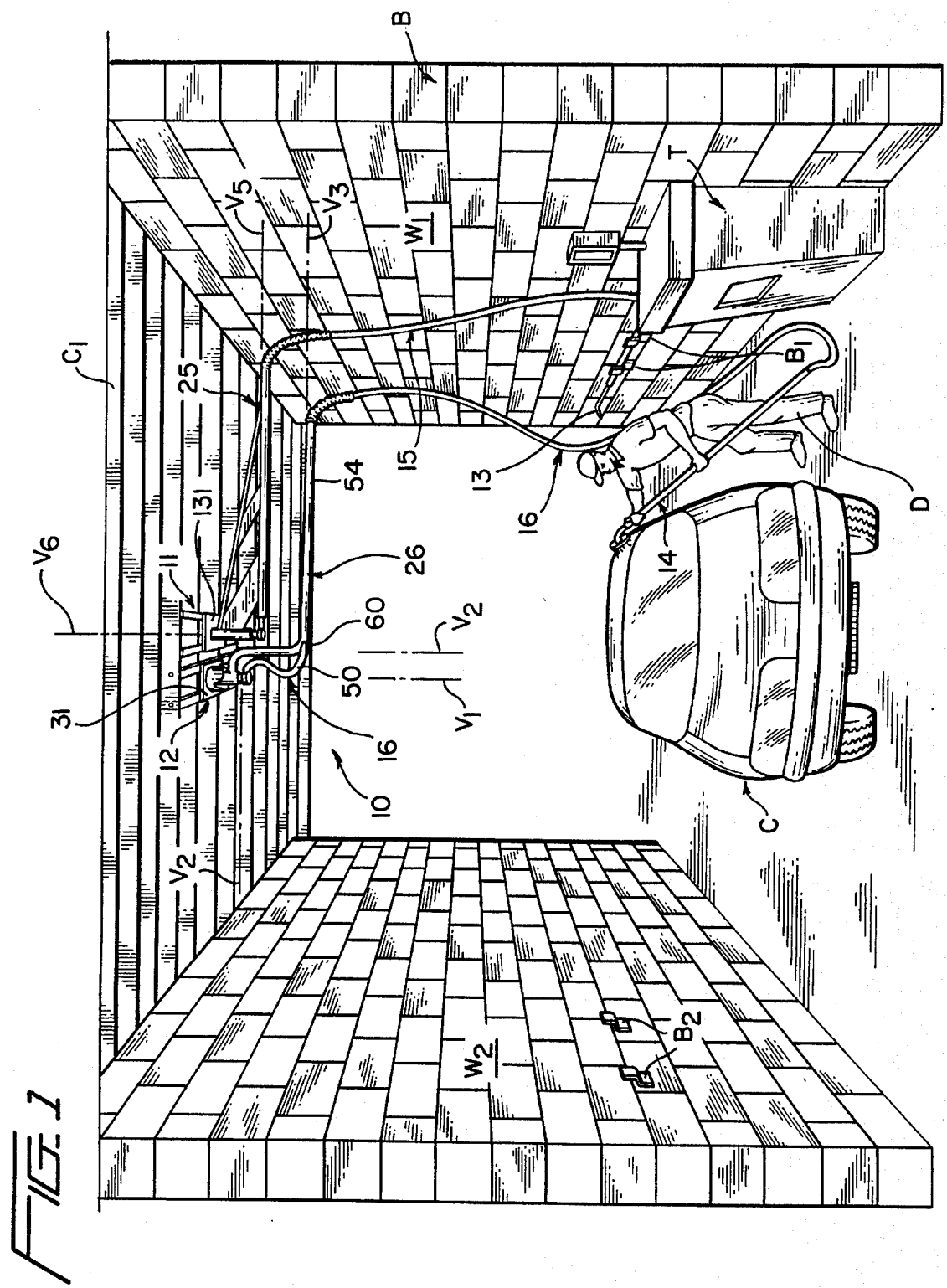
FIG. 1 is a perspective view of a car wash bay and illustrates the apparatus of the present invention in the form of a low pressure washing brush boom and a high pressure rinsing wand boom, each mounted for rotation about vertical side-by-side axes in which a free end portion of the washing brush boom is disposed in a horizontal plane of rotation beneath a horizontal plane of rotation of the rinsing wand boom which allows the washing brush boom to rotate beyond 360° in either direction during the washing of a car or similar vehicle within the bay.
Figure 2:
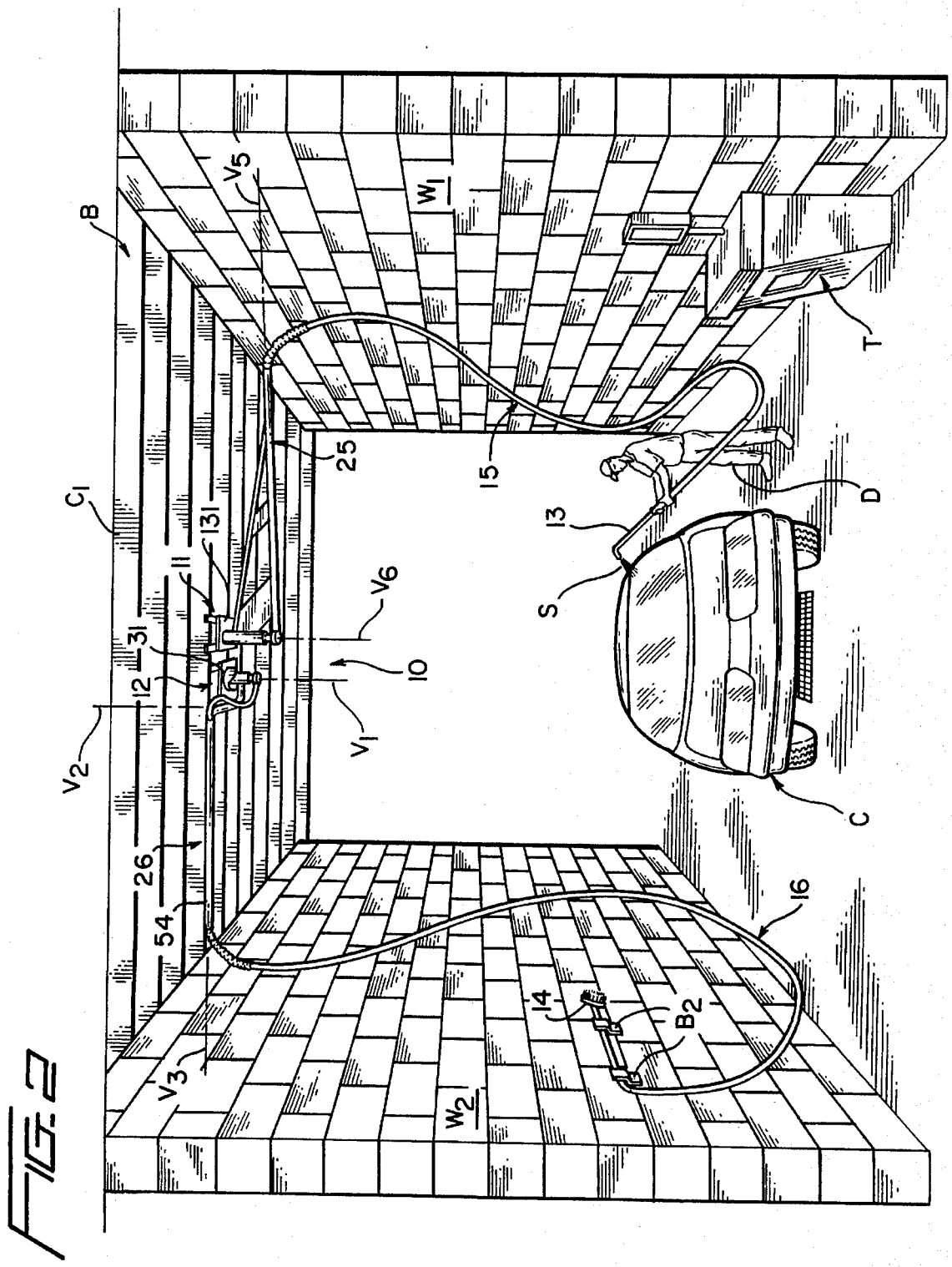
FIG. 2 is a perspective view of the car wash bay of FIG. 1, and illustrates the washing brush boom in a retracted position with its free end portion pivoted about a horizontal axis from the position shown in FIG. 1 to a position in another horizontal plane of rotation above the horizontal plane of rotation of the rinsing wand boom which allows the latter to be rotated beyond 360° absent interference from the washing brush boom and/or its associated hose.

A novel apparatus for effecting side-by-side rotation of a pair of elements about substantially parallel axes of rotation absent interference therebetween is illustrated in FIGS. 1 and 2 of the drawings in association with an automobile or car wash bay B. The apparatus is generally designated by the reference numeral 10 and includes a high pressure rinsing wand supporting mechanism 11 and a low pressure washing brush supporting mechanism 12.

The high pressure rinsing wand supporting mechanism 11 is associated with a pre-washing or rinsing wand 13 (FIG. 2), while the low pressure washing brush mechanism 12 is associated with a washing brush 14 (FIG. 1). High pressure pre-rinsing, pre-washing or rinsing water is delivered from a source (not shown) via a flexible hose 15 to the high pressure pre-rinsing or rinsing wand 13 and issues therefrom as a relatively strong or powerful spray S, whereas low pressure soapy water from a suitable source (not shown) is selectively delivered via a flexible hose 16 to and through the handle (unnumbered) and through the low pressure washing brush 14.

An automobile, car or similar vehicle C is driven by a driver D into the car wash bay B between adjacent walls W1, W2 thereof which are spanned by a conventional ceiling C1. The driver D places coins, tokens and/or currency in a conventional coin, token and/or currency acceptor T which includes conventional push-buttons and/or a dial for selecting the particular operation which is to be performed by the driver or occupant D upon the car C. Normally a predetermined dollar value inserted into the acceptor T provides a predetermined time within which the car C must be pre-rinsed, washed and final rinsed and/or waxed, and the faster the latter can be accomplished, the less will be the cost involved. As will be more readily apparent hereinafter, the operation of the apparatus 10 allows the car C to be washed by the occupant D more rapidly and at less cost than heretofore provided by conventional car washing systems. However, the normal procedure, once suitable coins, tokens and/or currency have been inserted into the acceptor T, is for the driver or occupant D to select, by appropriately manipulating a dial or pressing buttons (not shown), a pre-rinse or pre-wash spray which is delivered by the pressure wand 13 (FIG. 2). The spray S issuing from the wand 13 is directed against the exterior of the car C to wet the entire car C and loosen and dislodge heavier dirt and soil. Once this has been accomplished, the high pressure wand 13 can be replaced in supporting relationship to associated brackets B1 or a conventional holster (not shown) upon the wall W1 (FIG. 1). The dial or buttons are then manipulated by the driver D to provide low pressure soap water via the hose 16 to the brush 14 which is then utilized by the driver D to wash the car C, as is shown in FIG. 1. Once the automobile C has been thoroughly suds and washed, the driver D replaces the washing brush 14 upon the brackets B2 (FIG. 2) or an associated holster (not shown) upon the wall W2, returns to the brackets B1, removes the high pressure washing wand 13 therefrom and sprays the car C to remove the suds therefrom and essentially finally rinses the car C. During all of the operations just described, the occupant or driver D walks around the automobile or car C in different directions and, of course, the apparatus 10 is designed such that the specific construction of the high pressure rinsing wand supporting mechanism 11 and the low pressure washing brush supporting mechanism 12 permits unobstructed movement of the driver D, particularly by preventing interference between the hoses 15, 16 and the respective high pressure rinsing wand and the low pressure washing brush booms 25, 26 associated therewith.

Figure 3:
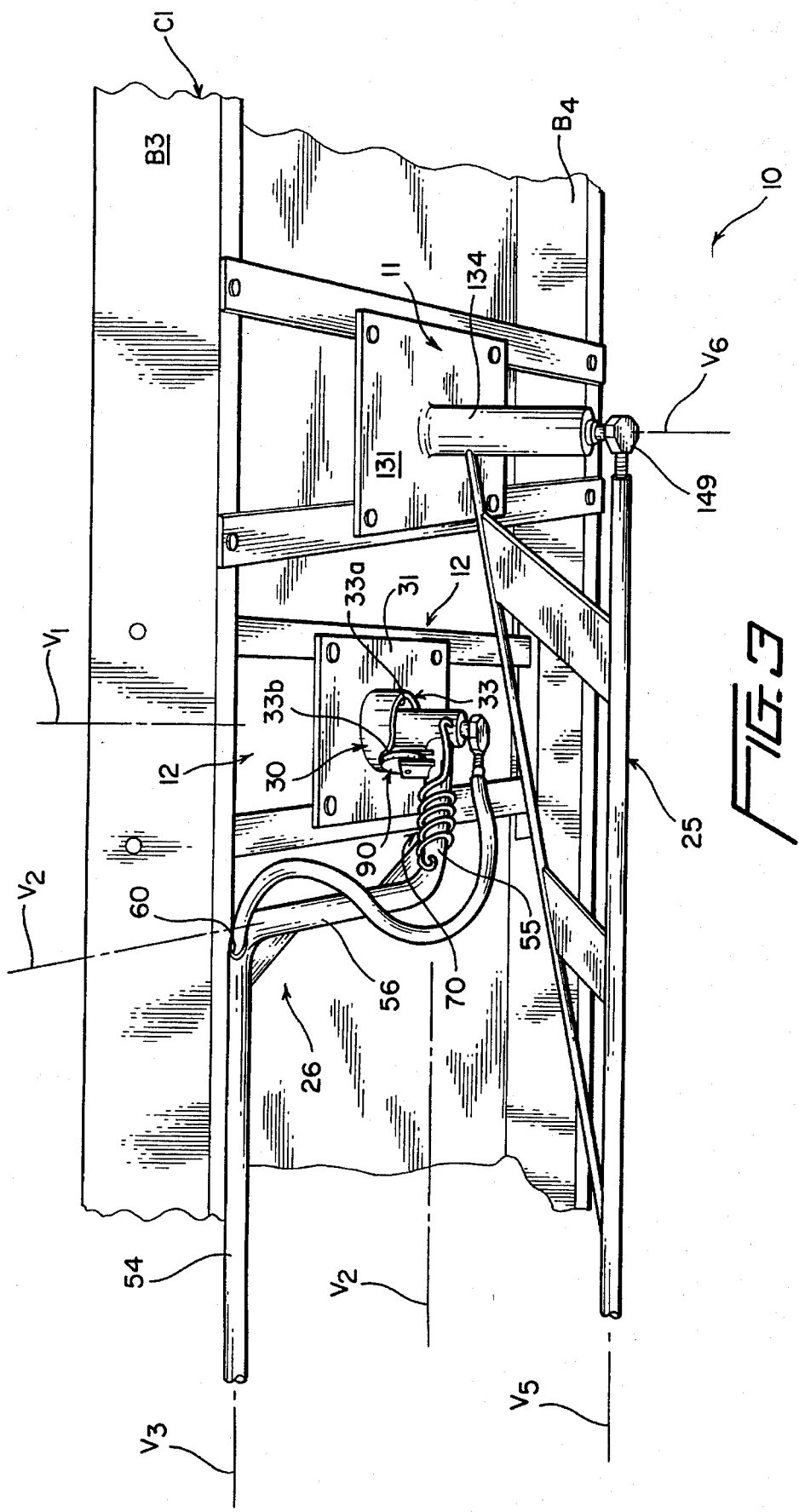
FIG. 3 is an enlarged fragmentary perspective view of an upper portion of FIGS. 1 and 2, and illustrates support members associated with the washing brush and rinsing wand booms for supporting the booms from a ceiling of the car wash bay.
Figure 4:
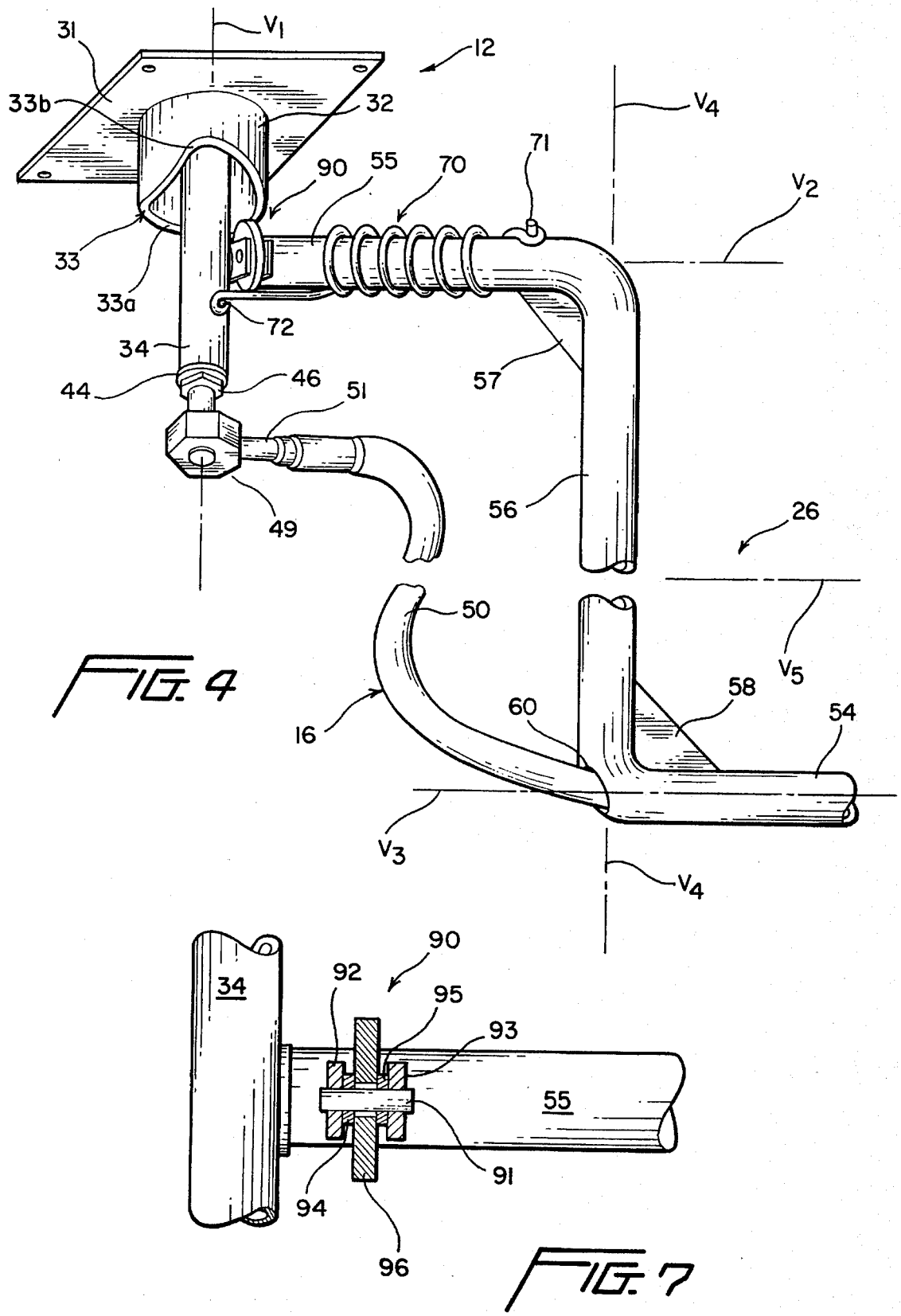
FIG. 4 is an enlarged fragmentary perspective view of the support member of the washing brush boom, and illustrates first and second end portions of the boom and a medial offset portion therebetween, a spring for biasing a cam carried by the boom relative to a follower, and a hose for delivering soap water to the associated washing brush.
Figures 5, 6:
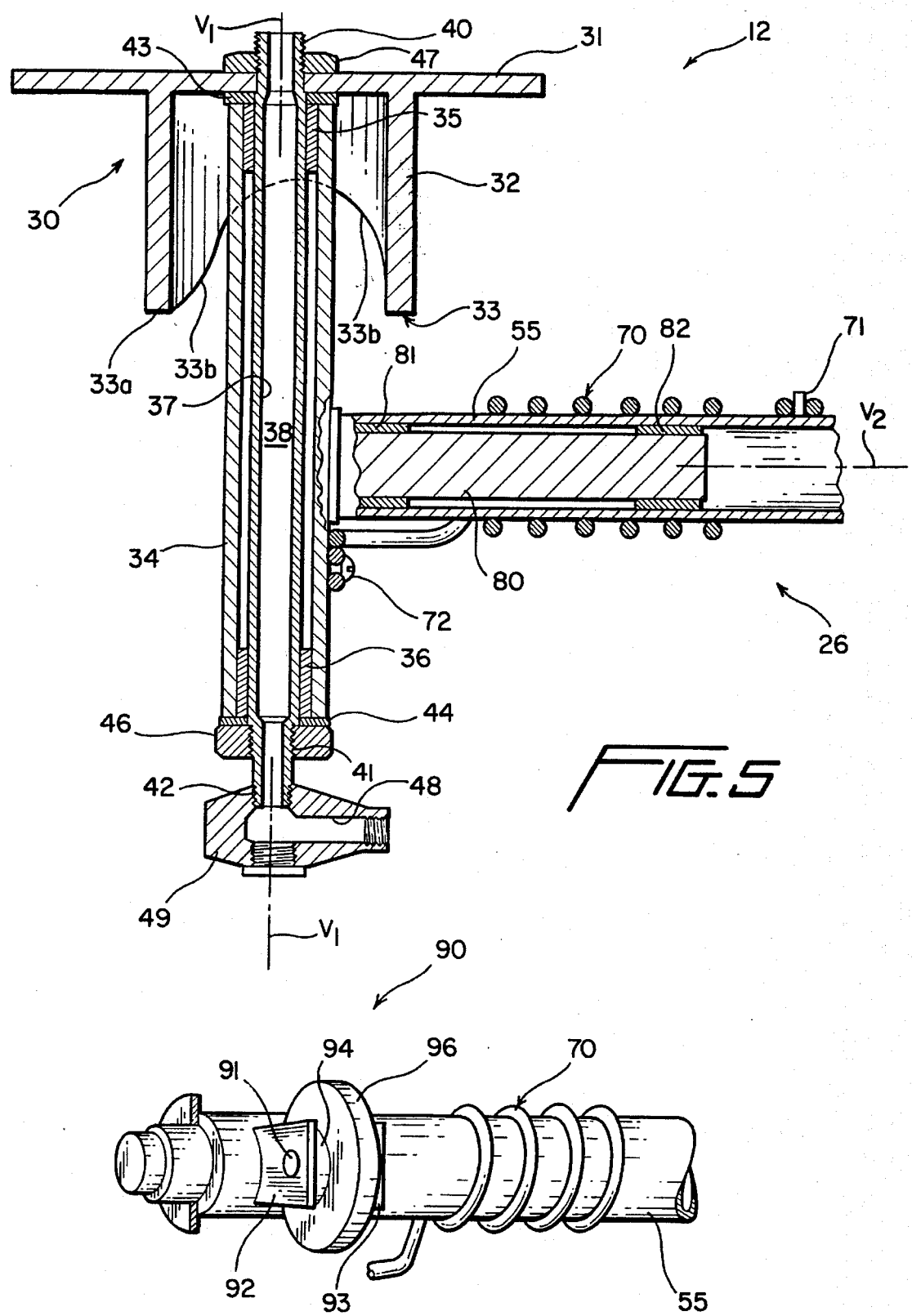
FIG. 5 is an enlarged fragmentary vertical sectional view through the support member, cam and a portion of the boom of FIG. 4, and illustrates the details of two means for supporting the washing brush boom for rotation about vertical and horizontal axes normal to each other.
FIG. 6 is a fragmentary perspective view of an end portion of the washing brush boom, and illustrates details of the spring and the cam follower carried thereby.

Reference is particularly made to FIGS. 3, 4 and 5 of the drawings and the construction of the low pressure washing brush supporting mechanism 12, the low pressure washing brush boom 26 thereof and support means 30 for supporting the boom 26 for rotation about a vertical axis V1. The support means 30 includes a generally rectangular support plate 31 conventionally secured to beams B3, B4 of the ceiling C1 and surrounded by a depending generally cylindrical collar 32 having cam means 33 in the form of a surface which cooperates with a cam follower to be described hereinafter for selectively permitting the low pressure washing brush boom 26 to be rotated about a generally horizontal axis V2 which is normal to the axis V1 (See FIGS. 4 and 5).

The support means 30 includes a tubular cylindrical support member 34 which houses an upper annular bushing 35 and a lower annular bushing 36 which in turn telescopically embrace another tubular or cylindrical support member 37 having an upper exterior thread 40 and lower exterior threads 41, 42. An upper flat washer or bushing 43 is sandwiched between an annular end face (unnumbered) of the support member 34 and the support plate 31 while a lower flat washer or bushing 44 is sandwiched between a lower end face (unnumbered) of the support member 34 and a nut 46. The upper threads 40 project through an opening 45 in the support plate 31 and secured to the threads 40 is a threaded nut 47. The threaded nut 46 is threaded upon the thread 41, as is best illustrated in FIG. 5, and through the latter connections both of the support members 34, 37 are supported by the support plate 31 with the support member 34 being rotatable through 360° relative to the fixed support member 37 about the vertical axis V1. An appropriate hose or conduit (not shown) is connected to the thread 40 to conduct soapy water into a port or passage 38 of the support member 37 which in turn passes into a port or passage 48 of a fitting 49 which is threaded to the lower exterior threads 42, again as best shown in FIG. 5. An end portion 50 of the flexible hose 16 (FIG. 4) carries an externally threaded fitting 51 which is threaded into the threads (unnumbered) of the passage 48 of the fitting 49. Thus, soapy water introduced into the passage 38 is delivered by the hose 16 to the washing brush 14.

The boom 26 is tubular and includes opposite tubular boom end portions 54, 55 and a tubular medial boom portion 56 with appropriate reinforcing or rigidifying plates 57, 58 being welded at bends (unnumbered) between the boom portions 55, 56 and 54, 56, respectively (FIG. 4). A circular opening 60 is formed at the bend (unnumbered) between the boom portions 54, 56 (FIG. 4) to allow the passage therethrough of the hose 16. An axis of the boom end portion 54 is designated by the reference character V3, the axis V2 corresponds to the center axis of the end portion 55, and an axis of the medial boom portion 56 is designated by the reference character V4. It is to be noted that the axes V2, V3 are parallel to each other and define generally horizontal parallel planes in each of FIGS. 1, 2 and 4, whereas the axis V4 of the medial offset boom portion 56 is normal to the axes V2 and V3. The significance of the latter structure will be readily apparent hereinafter.

Spring means or biasing means 70 in the form of a torsion spring encircles the boom end portion 55 and has one end connected to a pin 71 welded to the boom end portion 55 while an opposite end of the torsion spring 70 is fixed to the support member 34 by a screw 72, as is readily apparent in FIG. 4. The biasing direction of the torsion spring 70 is such as to biasingly rotate the low pressure washing brush boom 26 from the position shown in FIGS. 1 and 4 in which the axis V5 of the high pressure rinsing wand boom 25 is between the axes V2, V3 and the position shown in FIGS. 2 and 3 in which the axis V3 of the boom end portion 54 is above the axis V2 of the boom end portion 55 and the axis V5 of the boom 25.

The end portion 55 of the low pressure washing brush boom 26 is mounted for rotation through a slidable telescopic connection in the form of an internal telescopic support member or portion 80 (FIG. 5) of a generally cylindrical configuration which is welded to the exterior of the support member 34. A pair of annular bushings 81, 82 are in external telescopic relationship to the internal or first telescopic member 80 whereas the end portion 55 of the boom 26 defines the second telescopic portion of the telescopic connection. Thus, in FIG. 4 the torsion spring 70 is in external telescopic relationship to the boom end portion 55 which in turn is in external telescopic relationship to the bushings 81, 82 which are in turn in external telescopic relationship to the telescopic member 80. Thus, the telescopic connection of the elements 80 through 82 and 55 allow the boom 26 to rotate between the position shown in FIGS. 1 and 2 under the biasing force of the spring biasing means 70 by rotating about the axis V2. Thus, in one position the axis V3 is above the axis V2 (FIGS. 2 and 3) while in another position (FIGS. 1 and 4), the axis V3 is below the axis V2.

Cam follower means 90 (FIGS. 4 and 6) in the form of a cam roller is supported by a pin 91 between a pair of legs or brackets 92, 93 (FIGS. 6 and 7). Bushings 94, 95 (FIG. 7) are positioned between the cam follower 90 and the respective brackets 92, 93. The cam follower 90 includes a cylindrical surface 96 which is aligned with and rides upon the cam means or cam surface 33 (FIG. 4) which for approximately 270° lies in a common horizontal plane and for 90° deviates from the plane, as evidenced by the cam surfaces 33a and 33b of FIGS. 4 and 5. When the cam follower 90 is upon the surface 33a, the low pressure washing brush boom 26 is held in the position illustrated in FIG. 4 but as the cam follower 90 approaches the cam surface 33b from either a clockwise or counterclockwise direction, the bias of the spring means 70 pivots the boom 26 about the axis V2 reaching a maximum when the cam follower 90 hits the low spot of the cam surface 33b, as is best shown in FIG. 3. The high pressure rinsing wand boom 25 can then pass freely beneath the low pressure washing boom 26 when rotated in either a clockwise or counterclockwise direction through 360°. In other words, when the axis V5 of the high pressure rinsing wand boom 25 is below the axis V3 of th low pressure washing brush boom 26 (FIGS. 2 and 3), the high pressure rinsing wand boom 25 can rotate freely in a horizontal plane of the axis V5 or defined by the axis V5. The location of the low pressure washing brush boom 26 in FIGS. 2 and 3 is the nonuse or "parked" position of the washing brush 14 and thus as the operator D is utilizing the rinsing wand 13, he can freely walk around the car C and the high pressure rinsing wand boom 25 will essentially "follow" him during its rotation and will not at any time interfere with the low pressure washing brush boom 26 or the hose 16 thereof, as is most readily apparent from FIG. 2. However, should the wand 13 be placed upon the brackets B1 (FIG. 1), the washing brush wand 14 can be utilized by the operator who can likewise walk around the car C to wash the same utilizing the washing brush 14. Since the low surface 33b of approximately 90° essentially faces or opens towards the wall W2, the low pressure washing brush boom 26 will remain substantially in the noninterfering or "parked" position shown in FIG. 2 during the washing of the left-hand side or passenger side of the car C, as visualized in FIG. 1 or 2. However, as the driver or occupant D walks from the center of the occupant's side of the car toward the front or toward the back and he pulls the hose 16 which in turn rotates the Washing low pressure washing brush boom 26, the cam follower 90 moves away from the low cam surface 33b toward either side of the high cam surface 33a resulting in the progressive pivoting of the low pressure washing brush boom 26 from the position shown in FIGS. 2 and 3 to the position shown in FIGS. 1 and 4. In the position shown in FIGS. 1 and 4, the axis V3 of the washing brush boom portion 54 of the low pressure washing brush boom 26 is below the axis V5 of the high pressure rinsing wand boom 25, and thus the low pressure washing brush boom 26 can be continuously pivoted about the axis V6 beyond 360° without interfering with the high pressure rinsing wand boom 25 or its hose 15 when, of course, the wand 13 is properly supported upon the brackets B1.

The high pressure rinsing wand supporting mechanism 11 includes a support plate 131 identical to the support plate 31 excluding the collar 32 of the latter. The support plate 131 also includes an opening (not shown) corresponding to the opening 45 and an outer support member 134 corresponding to the support member 34. The support member 134 includes elements corresponding to the elements 35, 36; 43, 44; and 41 through 47 arranged such that the outer support member 134 rotates about the vertical axis V6 (FIGS. 1, 2 and 3) which is generally offset from and parallel to the vertical axis V1 of the low pressure washing brush boom 26. The high pressure rinsing wand boom 25 is, of course, tubular and a fitting 149 corresponding to the fitting 49 conducts high pressure water through the interior passage (not shown) corresponding to the passage 38 (FIG. 5) through the fitting 149 and through the high pressure rinsing wand boom 25 and the hose 15 connected thereto for achieving the spray S when the wand 13 is utilized. Thus, when the wand 13 is being utilized with the low pressure washing brush boom 26 positioned as shown in FIGS. 2 and 3, the high pressure rinsing wand boom 25 can be rotated through 360° absent any interference whatsoever with the low pressure washing brush boom 26 or its hose 16 and the washing brush 14 associated therewith. Therefore, the low pressure washing brush boom 26 can rotate 360° and beyond in either direction when the high pressure rising wand boom 25 is within 90° to either side of its "parked" position. Thus, the apparatus 12 permits noninterfering rotary motion of the booms 25, 26 to achieve rapid and efficient washing of the car C than heretofore provided by conventional car wash systems.

Although a preferred embodiment of the invention has been specifically illustrated and described herein, it is to be understood that minor variations may be made in the apparatus without departing from the spirit and scope of the invention, as defined the appended claims.

What is claimed is:

1. Apparatus for moving an element automatically between first and second positions comprising a support member, first means for supporting said support member for rotation in opposite directions about a first axis of rotation, an element, second means for supporting said element relative to said support member for rotation in opposite directions about a second axis of rotation, said first and second axes of rotation being disposed in substantially transverse relationship to each other, means for normally biasing said element relative to said support member in a direction tending to rotatably move said element about said second axis from a first position in which said element is disposed substantially in a horizontal plane toward a second position substantially parallel to and removed from said horizontal plane, and cooperative cam means and cam follower means for selectively permitting movement of said element by said biasing means from said first position toward said second position.

2. The apparatus as defined in claim 1 wherein said first and second axes of rotation are disposed in substantially normal relationship to each other.

3. The apparatus as defined in claim 1 wherein said first axis is disposed in a substantially vertical plane.

4. The apparatus as defined in claim 1 wherein said second rotation supporting means includes a telescopic connection.

5. The apparatus as defined in claim 1 wherein said second rotation supporting means includes a telescopic connection, and said telescopic connection includes a first telescopic portion of said support member and a second telescopic portion of said element.

6. The apparatus as defined in claim 1 wherein said biasing means is a spring.

7. The apparatus as defined in claim 1 wherein said biasing means is a spring cooperative between both said support member and said element.

8. The apparatus as defined in claim 1 wherein said biasing means is a torsion.

9. The apparatus as defined in claim 1 wherein said biasing means is a torsion spring cooperative between both said support member and said element.

10. The apparatus as defined in claim 1 wherein one of said cam and cam follower means is carried by said element.

11. The apparatus as defined in claim 1 wherein said cooperative cam and cam means follower means includes a cooperative cam and cam follower, and said cam follower is carried by said element.

12. The apparatus as defined claim 1 wherein said element includes first and second opposite end portions and a medial portion therebetween, and said element first and second opposite end portions are in offset relationship to each other.

13. The apparatus as defined in claim 12 wherein said element second opposite end portion has an axis disposed substantially transverse to said first axis of rotation, and said element second rotation supporting means is at least defined in part by said element second opposite end portion.

14. The apparatus as defined in claim 12 wherein said element second opposite end portion has an axis disposed substantially transverse to said first axis of rotation, and said element second opposite end portion and said biasing means are in generally relative telescopic relationship to each other.

15. The apparatus as defined in claim 12 wherein said element second opposite end portion has an axis disposed substantially transverse to said first axis of rotation.

16. The apparatus as defined in claim 15 wherein said cooperative cam means and cam follower means includes a cam and a cam follower, and said cam follower is carried by said element second opposite end portion.

17. The apparatus as defined in claim 15 wherein said cooperative cam means and cam follower means includes a cam and a cam follower, and said cam follower is carried by said element second opposite end portion, and said dam is at least in partial encircling relationship to said first axis of rotation.

18. The apparatus as defined in claim 15 wherein said cooperative cam means and cam follower means includes a cam and a cam follower, and said cam is at least in partial encircling relationship to said first axis of rotation.

19. The apparatus as defined in claim 15 wherein said basing means is a spring.

20. The apparatus as defined in claim 15 wherein said biasing means is a spring, and said torsion spring and said element second opposite end portion are in generally relative telescopic relationship to each other.

21. The apparatus as defined in claim 15 wherein said biasing means is a torsion spring cooperative between said element and to said support member, said cooperative cam means and cam follower means includes a cam and a cam follower, and said cam follower is carried by said element second opposite end portion, said cam is at least in partial encircling relationship to said first axis of rotation.

22. The apparatus as defined in claim 21 wherein said second rotation supporting means includes a telescopic connection, and said telescopic connection includes a projecting portion of said support member in telescopic relationship to said element second opposite end portion.

23. The apparatus as defined in claim 22 wherein said torsion spring is in substantially telescopic relationship to said element first opposite end portion.

24. The apparatus as defined in claim 1 wherein said cooperative cam means and cam follower means includes a cam and a cam follower, and said cam is at least in partial encircling relationship to said first axis of rotation.

25. Apparatus for effecting side-by-side rotation of a pair of elements about substantially spaced parallel axes of rotation absent interference therebetween comprising a pair of elements defined by first and second elements disposed in generally adjacent relationship to each other, first means for supporting said first element for rotation about a first axis of rotation, second means for supporting said second element for rotation about a second axis of rotation, said first and second axes of rotation being substantially in spaced parallel relationship to each other, said first element being defined by first and second opposite end portions offset by a medial portion therebetween, said second element being disposed for rotation by said second element rotation supporting means for rotation in a first plane of rotation, said first element first and second opposite end portions being disposed for rotation by said first element rotation supporting means for rotation in respective second and third planes of rotation, said first plane of rotation being disposed between said second and third planes of rotation, and means mounting said first element for rotatably moving said first element second end portion about an axis substantially transverse to at least one of said spaced parallel axes of rotation to a position of noninterference relative to the rotation of said second element about said first axis of rotation in said first plane of rotation.

26. The apparatus as defined in claim 25 wherein said first and second axes of rotation are disposed substantially vertical.

27. The apparatus as defined in claim 25 wherein said first, second and third planes of rotation are disposed substantially horizontally.

28. The apparatus as defined in claim 27 wherein said first element second end portion movement mounting means effects movement of said first element second end portion from a position below said first plane of rotation to a position above said first plane of rotation.

29. The apparatus as defined in claim 25 wherein said first and second axes of rotation are disposed substantially vertical, and said first, second and third planes of rotation are disposed substantially horizontally.

30. The apparatus as defined in claim 29 wherein said first element second end portion movement mounting means effects movement of said first element second end portion from a position below said first plane of rotation to a position above said first plane of rotation.

31. The apparatus as defined in claim 25 wherein said first element mounting means mounts said first element for rotational movement.

32. The apparatus as defined in claim 25 wherein said first element mounting means mounts said first element for rotational movement about a substantially horizontal axis.

33. The apparatus as defined in claim 25 including first fluid conducting means for conducting fluid along a path of travel which includes said second axis of rotation and said third horizontal plane.

34. The apparatus as defined in claim 25 including first fluid conducting means for conducting fluid along a path of travel which includes said second axis of rotation and said third horizontal plane, and second fluid conducting means for conducting fluid along a path of travel which includes said first axis of rotation and said first plane of rotation.

35. The apparatus as defined in claim 34 including first fluid conducting means for conducting fluid along a path of travel which includes said second axis of rotation and said third horizontal plane, and second fluid conducting means for conducting fluid along a path of travel which includes said first axis of rotation and said first plane of rotation.

36. The apparatus as defined in claim 35 wherein said first and second axes of rotation are disposed substantially vertical, and said first, second and third planes of rotation are disposed substantially horizontally.

37. The apparatus as defined in claim 36 wherein said first element mounting means mounts said first element for rotational movement about a substantially horizontal axis.

38. The apparatus as defined in claim 25 including means for normally biasing said first element second end portion in a direction toward said third plane of rotation, and cam and cam follower means for selectively permitting movement of said first element second end portion by said biasing means from said third plane of rotation to said position of noninterference.

39. The apparatus as defined in claim 28 wherein said first and second axes of rotation are disposed substantially vertical.

40. The apparatus as defined in clam 38 wherein said first, second and third planes of rotation are disposed substantially horizontally.

41. The apparatus as defined in claim 38 wherein said first and second axes of rotation are disposed substantially vertical, and said first, second and third planes of rotation are disposed substantially horizontally.

42. The apparatus as defined in claim 38 wherein said first element mounting means mounts said first element for rotational movement.

43. The apparatus as defined in claim 38 wherein said first element mounting means mounts said first element for rotational movement about a substantially horizontal axis.

44. The apparatus as defined in claim 31 including first fluid conducting means for conducting fluid along a path of travel which includes said second axis of rotation and said third horizontal plane.

45. Apparatus for effecting side-by-side rotation of a pair of first and second arms absent interference therebetween comprising a pair of first and second arms, first means for rotatably supporting said first arm for rotation in opposite directions about a first axis of rotation, second means for rotatably supporting said second arm for rotation in opposite directions about a second axis of rotation, said first and second axes of rotation being substantially vertically disposed in parallel spaced side-by-side relationship to each other, said first arm being defined by first and second opposite end portions offset by a medial portion therebetween, said second arm being disposed for rotation by said second arm rotation supporting means for rotation in a first substantially horizontal plane of rotation, said first arm first and second opposite end portions being disposed for rotation by said first arm rotation supporting means for rotation in respective second and third substantially horizontal planes of rotation, said first plane of rotation being disposed between said second and third planes of rotation in one relative position thereof, and means mounting said first arm for moving said first arm second end portion to a position of noninterference relative to the rotation of said second arm about said first axis of rotation in said first plane of rotation to a second relative position thereof at which said second plane of rotation is disposed between said first and third planes of rotation.

46. The apparatus as defined in claim 45 wherein said first arm second end portion mounting means rotatably mounts at said first arm second end portion for rotation in opposite directions about an axis of rotation generally normal to said first axis of rotation.

\* \* \* \* \*